(12) United States Patent
Howard et al.

(10) Patent No.: US 7,030,770 B2
(45) Date of Patent: Apr. 18, 2006

(54) HYDROGEN STORAGE SYSTEM AND POWER SYSTEM INCORPORATING SAME

(75) Inventors: Gary Howard, Aurora (CA); Bill Stewart, Brampton (CA); Ghassan Sleiman, Scarborough (CA); Gabriel Marin, Georgetown (CA); Ry Smith, Oakville (CA); Rupert Merer, Toronto (CA); David McLean, Chatham (CA); Al Davidson, Chatham (CA)

(73) Assignee: Stuart Energy Systems Corporation, Ontario (CA)

( * ) Notice: Subject to any disclaimer, the term of this patent is extended or adjusted under 35 U.S.C. 154(b) by 0 days.

(21) Appl. No.: 10/375,040

(22) Filed: Feb. 28, 2003

(65) Prior Publication Data

US 2004/0178062 A1    Sep. 16, 2004

(51) Int. Cl.
   *G08B 21/00*    (2006.01)
(52) U.S. Cl. .................. 340/652; 340/632; 340/626; 340/3.1; 222/3; 204/196.02
(58) Field of Classification Search ................ 340/605, 340/632, 626, 652, 635, 540, 506, 3.1, 3.8, 340/3.7; 222/3; 307/64, 43; 204/270, 196.01, 204/196.02
See application file for complete search history.

(56) References Cited

U.S. PATENT DOCUMENTS

| | | |
|---|---|---|
| 4,002,553 A | 1/1977 | Arntz |
| 4,233,132 A | 11/1980 | Carr et al. |
| 4,344,831 A | 8/1982 | Weber |
| 4,781,029 A | 11/1988 | SerVass |
| 5,082,544 A | 1/1992 | Willey et al. |
| 5,372,617 A | 12/1994 | Kerrebrock et al. |
| 5,432,710 A | 7/1995 | Ishimaru et al. |
| 5,512,145 A | 4/1996 | Hollenberg |
| 5,512,787 A | 4/1996 | Dederick |
| 5,592,028 A | 1/1997 | Pritchard |
| 5,621,654 A | 4/1997 | Cohen et al. |
| 5,690,797 A | 11/1997 | Harada |
| 5,702,491 A | 12/1997 | Long et al. |
| 5,711,865 A | 1/1998 | Caesar |
| 5,779,866 A | 7/1998 | Tarancon |
| 5,799,624 A | 9/1998 | Hsieh |
| 5,817,157 A | 10/1998 | Checketts |
| 5,840,172 A | 11/1998 | Zugravu |
| 5,899,072 A | 5/1999 | Gode |
| 5,999,888 A | 12/1999 | Aubee |

(Continued)

FOREIGN PATENT DOCUMENTS

CA    2387634 A1    4/2001

(Continued)

*Primary Examiner*—Toan N. Pham
(74) *Attorney, Agent, or Firm*—Manelli Denison & Selter; Edward J. Stemberger

(57) ABSTRACT

There is provided a hydrogen storage system having one or more hydrogen storage containers disposed in a confined area with a vent line extending from the one or more storage containers to a location outside of the confined area. One or more sensors are disposed in the confined area for detecting one or more pre-determined unsafe conditions relating to the storage of hydrogen in the contained area and at least one actuator is provided for actuating an operable valve of the vent line to release the hydrogen from the hydrogen storage container to a location outside the confined area at a pre-determined release rate in response to a signal from the sensor indicating an unsafe condition. A power system incorporating a hydrogen storage system as described above is also provided.

20 Claims, 6 Drawing Sheets

U.S. PATENT DOCUMENTS

| | | |
|---|---|---|
| 6,021,402 A | 2/2000 | Takriti |
| 6,026,349 A | 2/2000 | Heneman |
| 6,057,051 A | 5/2000 | Uchida et al. |
| 6,107,691 A | 8/2000 | Gore et al. |
| 6,153,058 A | 11/2000 | Richardson, Jr. |
| 6,153,943 A | 11/2000 | Mistr, Jr. |
| 6,285,178 B1 | 9/2001 | Ball et al. |
| 6,285,964 B1 | 9/2001 | Babel et al. |
| 6,288,456 B1 * | 9/2001 | Cratty ......................... 307/64 |
| 6,294,276 B1 | 9/2001 | Ogino |
| 6,304,006 B1 * | 10/2001 | Jungreis ...................... 307/64 |
| 6,311,105 B1 | 10/2001 | Budike, Jr. |
| 6,366,889 B1 | 4/2002 | Zaloom |
| 6,512,966 B1 | 1/2003 | Lof et al. |
| 6,536,487 B1 * | 3/2003 | Ovshinsky et al. ......... 141/231 |
| 6,670,721 B1 | 12/2003 | Lof et al. |
| 6,673,479 B1 | 1/2004 | McArthur et al. |
| 6,774,506 B1 | 8/2004 | Hashimoto et al. |
| 6,824,909 B1 | 11/2004 | Mathias et al. |
| 6,857,447 B1 * | 2/2005 | Olander et al. ............. 137/240 |
| 6,860,923 B1 | 3/2005 | Myasnikov et al. |
| 2002/0093201 A1 | 7/2002 | Soucy |
| 2004/0023087 A1 * | 2/2004 | Redmond ..................... 429/19 |
| 2004/0080424 A1 * | 4/2004 | Perry et al. ................. 340/632 |

FOREIGN PATENT DOCUMENTS

| | | |
|---|---|---|
| DE | 3804659 A1 | 8/1989 |
| DE | 19612776 A1 | 10/1997 |
| GB | 2143848 A | 2/1985 |
| JP | 51-48818 | 4/1976 |
| JP | 01200052 A * | 8/1989 |
| JP | 02-117072 | 5/1990 |
| JP | 07-99707 | 4/1995 |
| JP | 07-101316 | 4/1995 |
| JP | 08-260176 | 10/1996 |
| JP | 09-306531 | 11/1997 |
| JP | 10-299576 | 11/1998 |

* cited by examiner

HYDROGEN STORAGE SYSTEM AND POWER SYSTEM INCORPORATING SAME

FIELD OF THE INVENTION

The present invention is directed to a system for storing hydrogen in a confined area and to power systems such as back-up power systems incorporating such hydrogen storage systems.

BACKGROUND OF THE INVENTION

The storage of hydrogen requires great care due to the explosive properties of the gas. As hydrogen becomes a preferred choice as an alternative fuel to fossil fuels there is a need for systems for storing hydrogen in a safe manner at a confined location such as within a building. This is particularly desirable for use in conjunction with a hydrogen fueled power system, for instance a back-up power system, for a facility. Commercially feasible systems for storing and using hydrogen in this manner are not currently available.

SUMMARY OF THE INVENTION

In one aspect the invention provides a hydrogen storage system comprising:
  a) at least one high pressure hydrogen gas storage container for storing high pressure hydrogen gas, said at least one high pressure hydrogen gas storage container being disposed in a confined area;
  b) a vent line extending from said at least one high pressure hydrogen gas storage container to a location outside the confined area wherein said hydrogen gas may be relatively safely released in response to a pre-determined unsafe condition;
  c) at least one sensor disposed in said confined area for detecting one or more predetermined unsafe conditions relating to the storage of hydrogen gas in the confined area; and
  d) at least one actuator in communication with said sensor for releasing hydrogen gas from said at least one high pressure hydrogen gas storage container through said vent line to said location outside of said confined area at a minimum pre-determined release rate in response to a signal received from said sensor.

In another aspect the invention provides a power system for providing back-up power to a facility comprising:
  a) a generating system disposed at the facility having at least one hydrogen generator and at least one hydrogen powered electrical generator.
  b) a storage system disposed at the facility having at least one high pressure hydrogen gas storage container for storing high pressure hydrogen gas received from said hydrogen generator, said storage system being disposed within said facility;
  c) a conduit for supplying hydrogen gas from said at least one hydrogen generator to said storage system;
  d) a conduit for supplying hydrogen gas from said storage system to said at least one electrical generator;
  e) a power interruption sensor for sensing an interruption in the supply of electric power from a primary electric power source;
  f) a back up power actuator in communication with the power interruption sensor for actuating said at least one hydrogen powered electrical generator to generate electricity in response to a signal from said power interruption sensor indicating an interruption in the supply of electricity from said primary electric power source;
  g) a vent line extending from said at least one high pressure hydrogen gas storage container to a location outside the facility where said hydrogen gas may be relatively safely released in response to a pre-determined unsafe condition;
  h) at least one unsafe condition sensor disposed in said facility for detecting one or more predetermined unsafe conditions relating to the storage of hydrogen gas in the facility; and
  i) at least one actuator in communication with said unsafe condition sensor for releasing hydrogen gas from said at least one high pressure hydrogen gas storage container through said vent line to said location outside of said facility at a minimum pre-determined release rate in response to a signal received from said unsafe condition sensor.

In another aspect the invention provides a power system for a facility comprising:
  a) hydrogen generator for producing hydrogen;
  b) a hydrogen powered electrical generator for producing electricity;
  c) a storage system comprising at least one storage container for storing hydrogen produced by said hydrogen generator, said at least one storage container being connected to deliver hydrogen to said hydrogen powered electrical generator to produce electricity from hydrogen stored in said storage system;
  d) a fuel station connected to said storage system, said fuel station comprising at least one fuel dispensing device for dispensing hydrogen to one or more hydrogen powered vehicles located at the facility;
  e) a power interruption sensor for sensing an interruption in the supply of electric power to the facility from a primary electric power source;
  f) a back up power actuator in communication with the power interruption sensor for actuating said at least one hydrogen powered electrical generator to generate electricity in response to a signal from said power interruption sensor indicating an interruption in the supply of electricity from said primary electric power source.

DETAILED DESCRIPTION OF THE INVENTION

Figure 1:
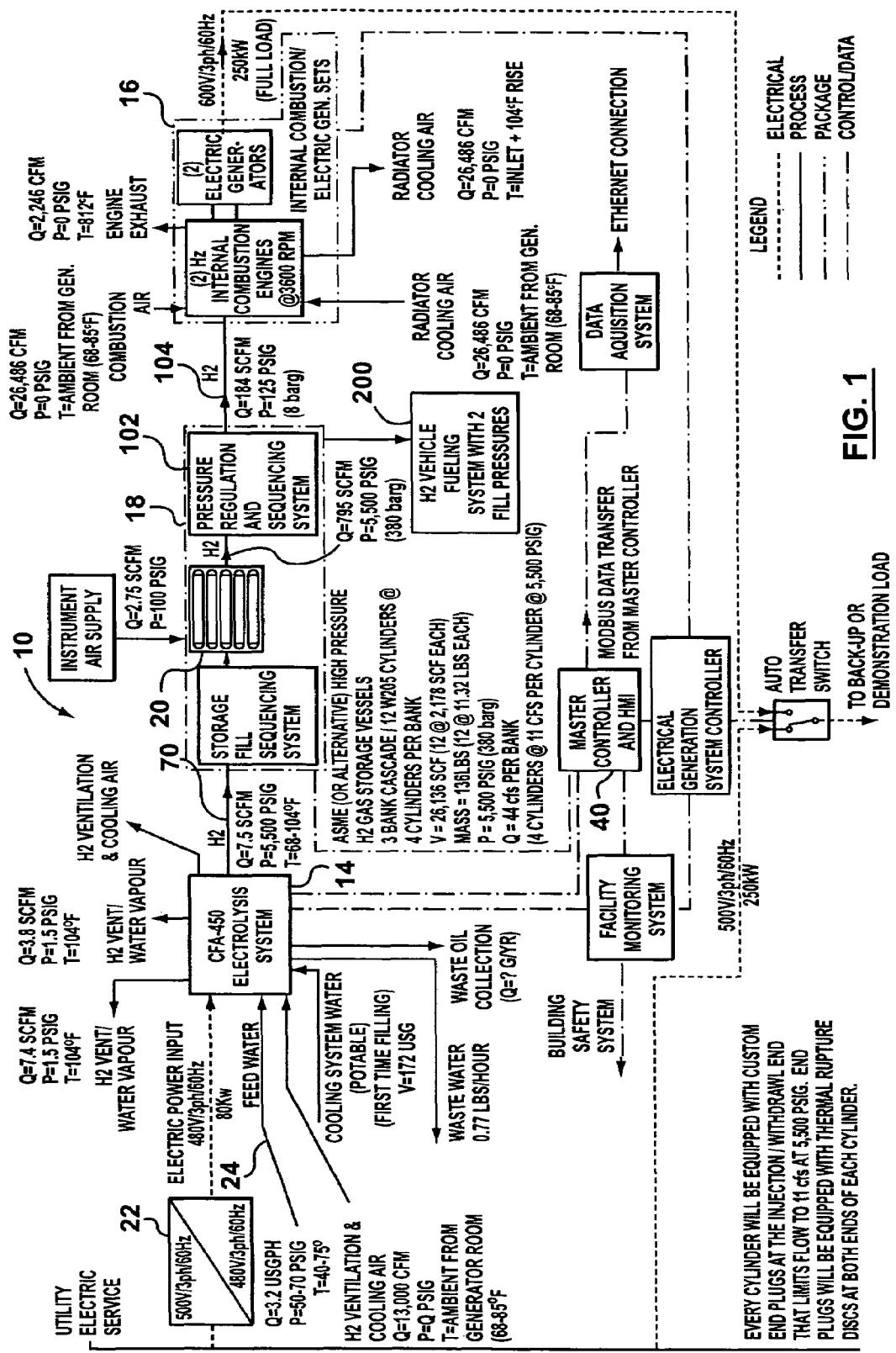
FIG. 1 is a schematic view of a power system with a hydrogen storage system in accordance with the present invention.

A power system in accordance with the present invention is depicted generally at 10 in FIGS. 1–6. The system 10 includes a generation system 12 comprising at least one hydrogen generator 14 and at least one hydrogen fueled electrical generator 16. The system 10 also includes a hydrogen storage system 18 comprising at least one hydrogen storage container 20. The hydrogen generator 14 receives electrical power from a power source 22 and water from a water source 24. The hydrogen generator 14 then operates in known manner to produce hydrogen that is then transferred to the storage system 20. The stored hydrogen may then be used to fuel the electrical generators 16 to produce backup power for a facility or the hydrogen may be used for other purposes such as for fueling a hydrogen receiving device at a fuel station 200.

The generation system 12 of the preferred embodiment has a hydrogen generator 14 that is a CFA 450 Community Fueler Appliance (TM) manufactured by Stuart Energy Systems Corporation which is able to generate 450 scfh of hydrogen at up to 6,000 psig operating pressure and two hydrogen fueled electrical generators 16 that are Ford Power Products (FPP) hydrogen fueled, packaged internal combustion engine/generator sets (ICE) that will provide up to 135 kW of electrical output each complete with the necessary electrical equipment to produce electricity in a form compatible with the critical building circuits to be powered. Each of the above preferred electrical generator 16 requires 13,000 cfm of air to satisfy the integrated radiator's requirements and an additional 600 cfm for combustion air. Each electrical generator 16 also requires approximately 5250 scfh of hydrogen fuel at 75 psig when running at full load.

The hydrogen storage system 18 of the preferred embodiment has a number of high pressure hydrogen storage containers 20 of sufficient total capacity to supply fuel to the electrical generator 16 to run for a desired period of time (eg. two hours) under desired power conditions. Preferably, the storage containers 20 are conventional cylinders for receiving compressed gas where each storage container 20 has a capacity of 1550 scf at a pressure of 5,000 psig. The storage containers 20 will be designed to restrict the flow from each cylinder to 10 scfs and the total from each bank to 50 scfs, maximum.

The components of the system 10 are mostly disposed in a generator room 30 and a storage room 32. The generator room 30 houses the hydrogen generator 14 and the electrical generators 16 and the storage room 32 houses the storage containers 20. The embodiment depicted in FIGS. 2–6 demonstrates one arrangement for the rooms 30 and 32 however it will be appreciated that numerous alternate arrangements are possible while still meeting the objectives of the invention. Thus, in FIGS. 2–6, the roof 33 of the storage room 32 is constructed with sufficient structural strength to serve as a mezzanine area 35 over the generator room 30 where the electrical generators 16 are located. The hydrogen generator 14 will occupy most of the ground floor of the generator room 30.

A viewing room 34 is also depicted in the FIGS. 2–5 for viewing the generator room 30. This is an optional element that is advantageous mainly to provide demonstrations of the operation of the system 10. The viewing room 34 is equipped with observation windows 36 and access stairs 38 to the generator room 30. The floor level in the viewing room 34 is above the floor level in the generator room 30 to provide optimum viewing. A master control panel 40 for the system 10 may be located in the viewing room 34 for ease of operation during facility demonstrations or it may be located at any convenient location outside the storage room 32.

Referring more specifically to the generator room 30, a ventilation plenum 50 is provided for introducing make-up air ventilation into the room from outdoors. The ventilation plenum 50 preferably delivers approximately 30,000 cfm of unconditioned make-up air and is sized to ensure that the static pressure drop across the radiator fans 52 for the electrical generators 16 is not more than ½ inches of water column, total system. The ventilation plenum 50 preferably extends through the roof 53 and is capped with a Greenheck Model WIH (trademark) pre-fabricated louvered penthouse 54 complete with roof curb 56 and motorized dampers 58 (or equivalent).

A generator room exhaust fan 60 is mounted on the roof 53 and the intake is preferably flush with the underside of the roof deck such that the fan 60 will remove any fugitive hydrogen emissions that may collect in the upper corners of the room. The generator room exhaust fan 60 provides 10,000 cfm of capacity at ½ inch static pressure, total system. The exhaust fan 60 is preferably a Greenheck TAUB (trademark) tube axial flow "upblast" belt drive fan complete with non-sparking impellers and integrated butterfly dampers (or equivalent). The fan 60 is fitted with an appropriately classified electric motor.

The generator room exhaust fan 60 is preferably a start/stop model which is thermostatically controlled to attempt to maintain the room temperature below a desired level (eg. 77° F.). The exhaust fan 60 is also activated by the control system PLC 62 such that the exhaust fan 60 runs for a desired period of time (eg. at least 5 minutes) every hour for general room exhausting. In addition, the fan 60 may be controlled by other devices that are integrated into the system 10.

A discharge pipe 64 is connected to the hydrogen generator 14 for the venting of excess oxygen and water vapour created by the hydrogen generator 14 during its operation. The discharge pipe 64 extends through the inside of the ventilation plenum 50 and discharges at the roof 53 through the curb box 56 of the pre-fabricated penthouse 54. The pipe 64 is sized to ensure that the hydrogen generator 14 is not exposed to a pre-determined excessive back pressure (eg. greater than or equal to 4" water column).

A second discharge pipe 68 is connected to the hydrogen generator 14 for venting excess, low-pressure hydrogen and water vapour. The second discharge pipe 68 preferably extends to the ceiling of the generator room 30 and then is routed through the roof 53 through the curb box 56 of the penthouse 54. The pipe 68 is sized to ensure that the hydrogen generator 14 is not exposed to a pre-determined excessive back pressure (eg. greater than or equal to 4" water column).

A supply line 70 extends from the hydrogen generator 14 to the storage containers 20 in the storage room 32 to transfer hydrogen at a desired pressure (eg. 5000 psig). This is described in more detail with reference to the storage room 32 structure.

Figure 2:
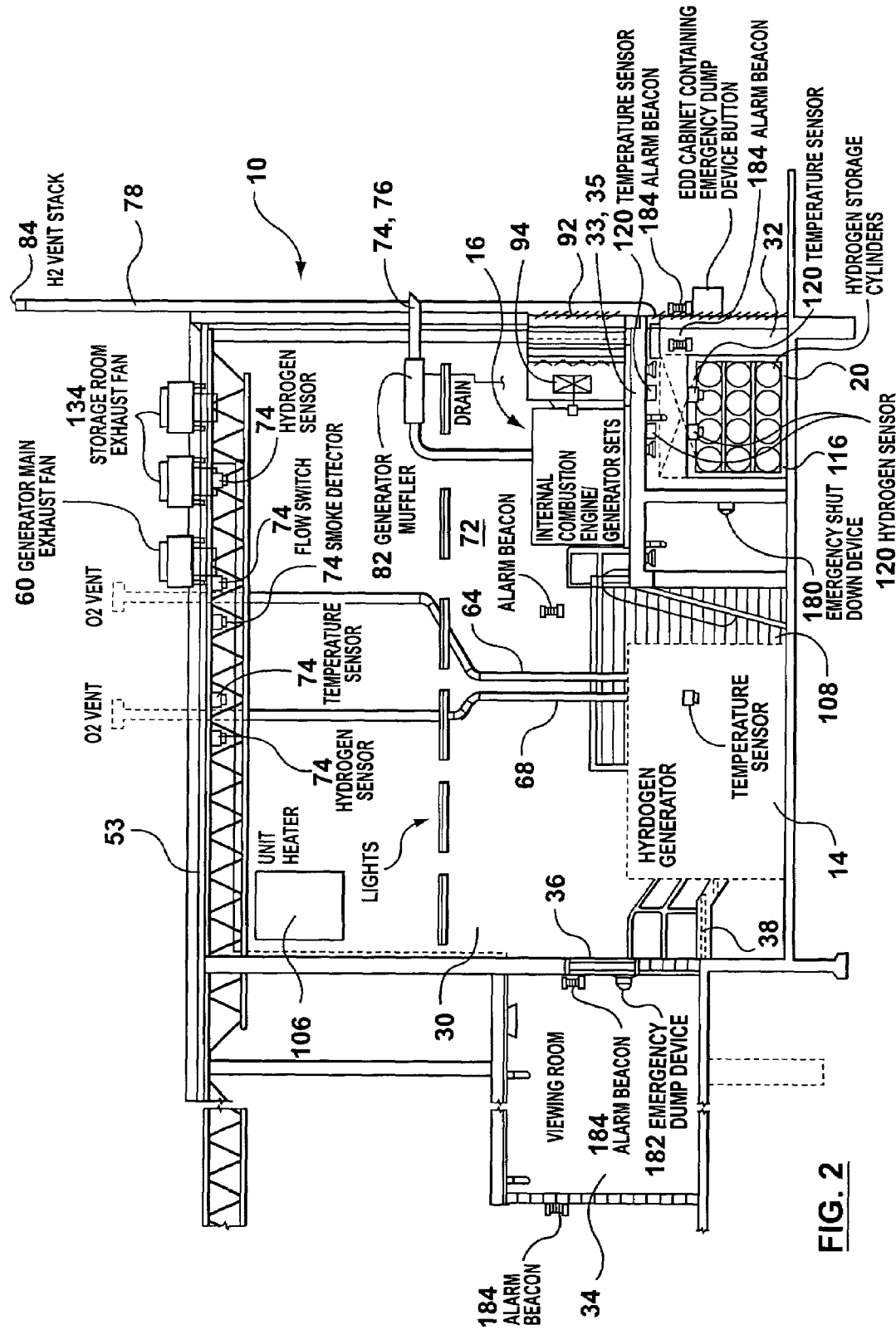
FIG. 2 is an elevation view of a generator room and a storage room for one embodiment of the system of FIG. 1.
Figure 3:
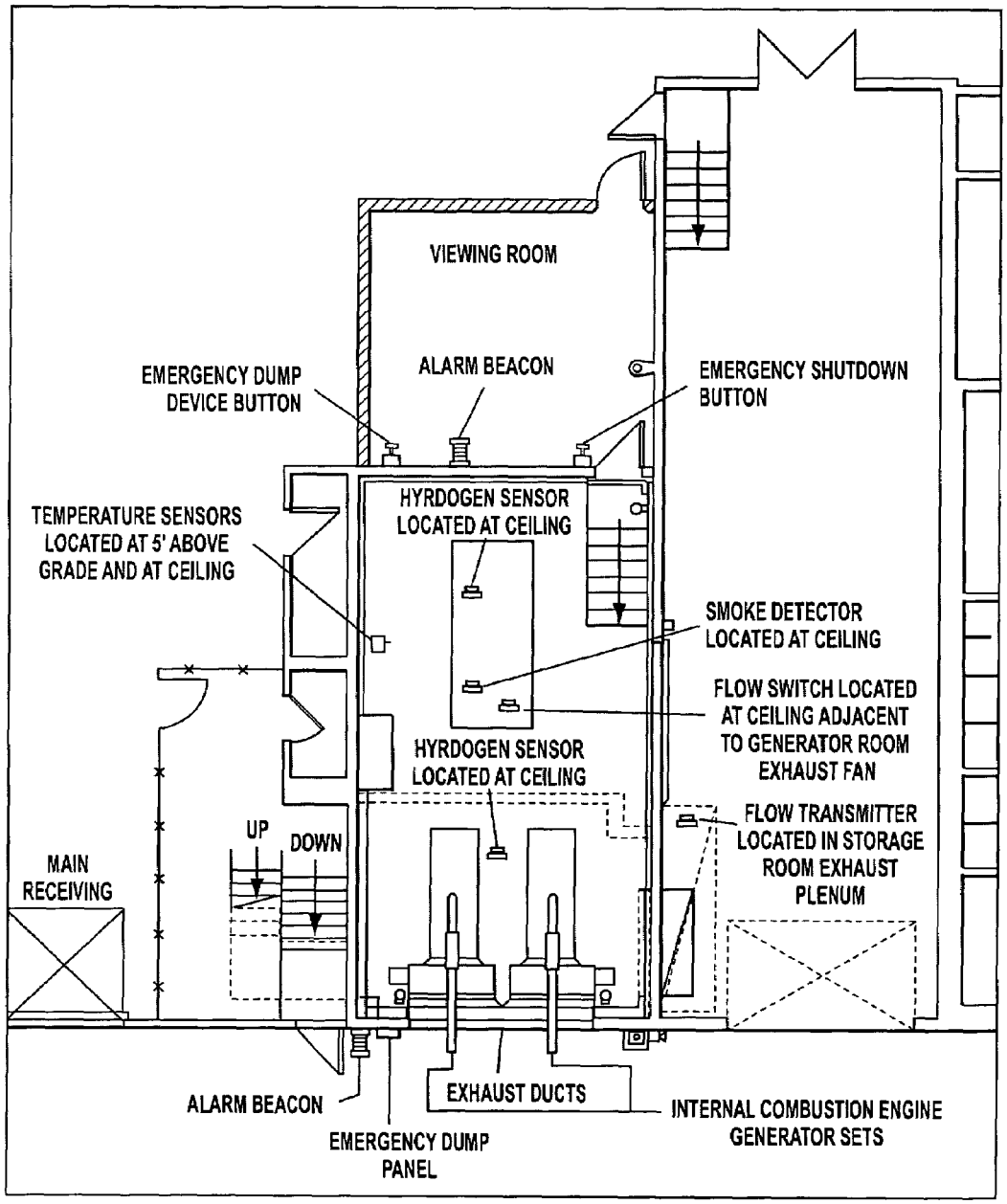
FIG. 3 is a plan view of the generator room for the system of FIG. 2.
Figure 4:
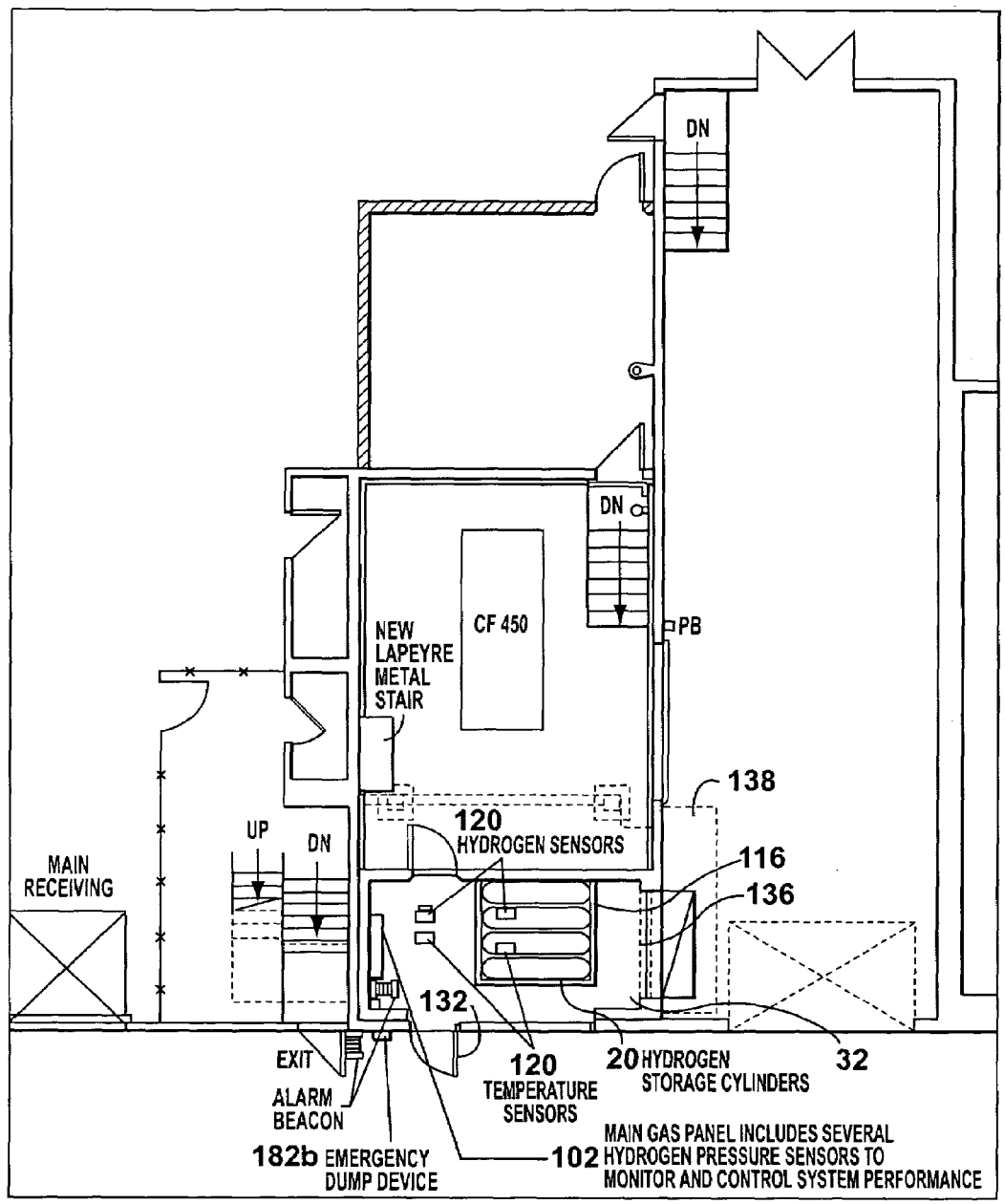
FIG. 4 is a plan view of the storage room for the system of FIG. 2.
Figure 5:
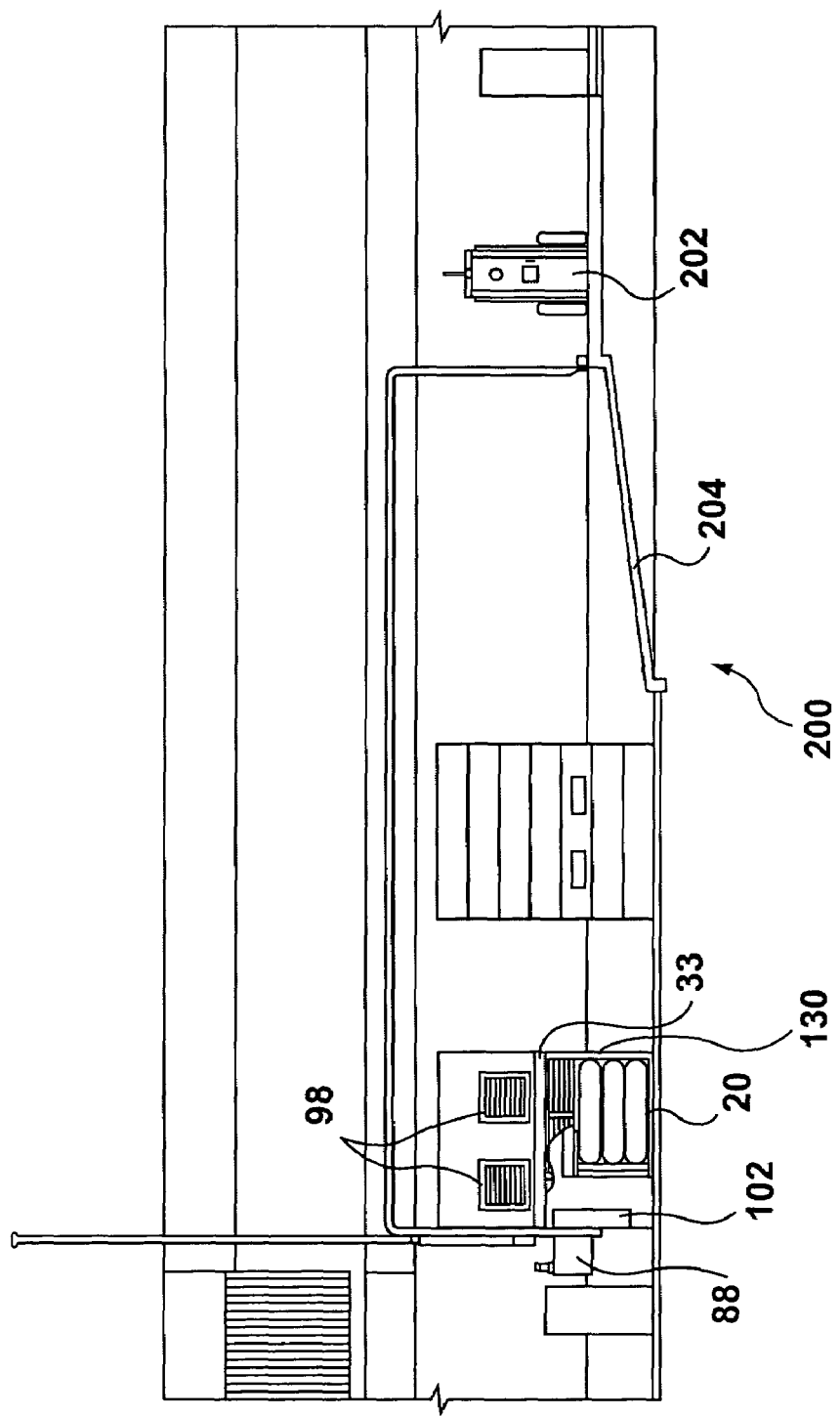
FIG. 5 is an elevation view of a fueling station for the system of FIG. 2.

The electrical generators 16 are placed on a mezzanine in the generator room 30 as depicted in FIGS. 2 and 3. As discussed above, alternate room arrangements are also contemplated.

Combustion air for the electrical generators 16 is preferably sourced from within the general space 72 of the generator room 30. The exhausts 74 for the engines 76 of the electrical generators 16 are preferably discharged through the roof 53 via two separate pipes 78 and 80 complete with critical grade mufflers 82 and gravity-activated caps 84.

The electrical generators 16 are oriented such that their radiators 90 will discharge through two separate suitably sized exhaust plenums 92 disposed in the wall. The exhaust plenums 92 are preferably equipped with outlet dampers 94 and re-circulation air discharge dampers 96 to re-circulate air from the electrical generators 16 back into the generator room 30 under cold weather conditions. The outlets 94 and 96 of the plenums 92 may be fitted with discharge air louvers 98, complete with drains. The louvers 98 are preferably sized to fill the entire wall area above the mezzanine floor. Any louver area not required for exhaust purposes may be fitted with blanking panels 100.

Hydrogen fuel for the electrical generators 16 may be provided at a desired pressure (eg. 75 psig) from a pressure regulator station 102 disposed inside the storage room 32. A single supply line 104 from the storage room 32 extends through the mezzanine floor and branches to a connection point on each engine for the electrical generators 16.

The generator room 30 is preferably equipped with a thermostatically controlled space heating device 106 that will maintain the temperature in the generator room 30 above a desired level (eg. 68° F.).

The generator room 30 may be equipped with a large access door 108 sized such that the large equipment that will be located in the generator room 30 and any equipment necessary to service that equipment is able to gain access through this door 108.

Referring now to the storage room 32, a sufficient number of storage containers 20 are provided to supply enough hydrogen to allow the electrical generator 16 to run for a desired minimum time period (eg. 2 hours) under desired power conditions. In the embodiment depicted in the figures, fifteen containers 20 arranged in three banks 110 are provided. Each container 20 preferably has a capacity of 1550 scf at a pressure of 5,000 psig. The storage containers 20 are designed to restrict the flow from each container 20 to 10 scfs and the total from each bank 110 to 50 scfs, maximum.

The containers 20 are racked horizontally with the bottom 112 of the containers 20 located along a louvered wall and the manifold tubing 114 located facing an opposing wall. The cylinder rack is covered by a sheet metal enclosure 116 that is designed to collect and direct any hydrogen leaks in the containers 20 or manifold piping upward to the opening 118 in the enclosure's roof. The primary hydrogen and temperature sensors 120 are mounted in this opening. This minimizes the detection time of a leak or fire in the storage bank arrangement.

Make-up air intake louvers 130 are located at the lower portion of the outside wall area of the storage room. A louvered, exterior access door 132, opening outward is also located along this wall. Preferably, none of the louvers 130 and 132 shall have back draft dampers. The louvers 130 and 132 deliver a desired amount (eg. 18,000 cfm) of unconditioned make-up air to the storage room 32 and are sized to ensure that the static pressure drop across the two fans 134 described below is not more than a desired amount (eg. ¼ inches of water column, total system). The louvers 130 and 132 are preferably designed to nominally deliver 250 cubic feet per minute of make-up air per square foot of louver and will require 75 square feet of louvered wall, including the exterior access door 132.

Storage room exhaust fans 134 are preferably mounted on the roof. The intake for the fans 134 is located in the storage room 32 ceiling at a location that will remove any hydrogen accumulation from the room. The exhaust intake 136 connects to an exhaust air plenum 138 that is preferably constructed of two hour rated dry wall, acoustically lined (or equivalent).

The storage room exhaust fans 134 preferably provide 9,000 cfm of capacity each with a total capacity of 18,000 cfm at ¼ inch static pressure, total system. The fans are preferably two identical Greenheck TAUB (trademark) tube axial flow "upblast" belt drive fans complete with non-sparking impellers and integrated butterfly dampers (or equivalent). The fans 134 are fitted with an appropriately classified electric motor.

The storage room exhaust fans 134 are start/stop models and are activated by the control system PLC 62 such that at least one of the fans 134 runs for a desired period of time (eg. at least 2 minutes every 60 minutes) for general room exhaust. The fan 134 that is activated for this function is preferably alternated such that the running hours of each fan 134 is accumulated approximately equally. In addition, the fans 134 will be controlled by other devices that are integrated into the system 10.

A pressure relief valve 140 is provided in the fuel line 142 between the outlet 144 of the pressure reducing station and the inlet 146 to the electrical generator fuel line 148. Each bank of storage containers 20 also requires a high-pressure relief vent line 150, 152 and 154. The hydrogen generator 14 also includes a vent line 156 to vent fugitive oxygen and hydrogen emissions and the associated water vapour. This venting will require the installation of four lines constructed of high-pressure steel tubing suitably sized and compatible fittings and valves plus the two lines 64 and 68 described in the generator room 30 section above for the low pressure hydrogen and oxygen and associated water vapour.

The high-pressure relief vent line from the hydrogen generator 14 is an integral part of the hydrogen generator design. Its primary purpose is to maintain adequate back-pressure on the outlet of the hydrogen compressors to ensure proper operation. If an overpressure situation occurs in the storage supply line from the hydrogen generator 14, the overpressure relief line is discharged into a "blow down" pressure vessel 160. This vessel 160 is of adequate strength and size to effectively accept the low flow, high-pressure hydrogen from the storage supply line and reduce it to low pressure. The blow down pressure vessel 160 is equipped with a relief valve 162 that allows the low pressure hydrogen and associated water vapour to vent to atmosphere via the hydrogen/water vapour vent line 64 and 68 described in the generator room 30 section above. All other hydrogen relief lines preferably exit the storage room at a desired level (eg. about 7.0 ft) above grade.

The high-pressure hydrogen relief system preferably consists of one pressure relief valve for the hydrogen generator fuel line and three pressure relief valves, one for each of the three banks of storage containers. The hydrogen generator fuel line relief valve is set to relieve at a desired pressure (eg. at 83 psig (110% of design pressure)). The storage relief valves are also set to relieve at a desired pressure (eg. 5,500 psig (110% of design pressure)).

In addition, the high-pressure lines from the three banks of storage are teed and piped to 3 Class 1, Zone 2 rated electrically actuated/pneumatically operated ball valves 166. These valves provide a closed-loop storage dump capability that is controlled by the system 10 complete with a manual override capability.

The outlets of all four vent lines are connected to a common vent stack 168. The vent stack 168 is installed at the point where all of the high-pressure vent lines exit the storage room (eg. about 7.0' above grade). The vent stack 168 is affixed to the exterior wall of the building and extends to a sufficient height (eg. approximately 20.0 ft above grade) where it terminates in an elbow 170 that directs the hydrogen away from the building and is covered with a gravity actuated rain cap 172.

The Safety Control System (SCS) 174 employs several strategies to ensure that the release of hydrogen into either the generator room 30 or the storage room 32 is avoided. In the unlikely event that a major hydrogen leak occurs, the SCS uses several redundant sensors 174 and associated closed-loop control devices 176 to mitigate the event. The mitigation strategy includes the manual or automatic dumping of a desired amount (eg. at least 95%) of all hydrogen in storage to atmosphere in a desired time period (eg. in less than 5 minutes).

In addition, manually actuated/electrically operated Emergency Stop Devices (ESDs) 180 and Emergency Dump Devices (EDDs) 182 complemented with visual/audible alarm beacons 184 are located in the viewing room, the generator room 30 and outdoors adjacent to the exterior access door to the storage room 32. The cabinet 188 located adjacent to the exterior storage room door that houses the EDD, 182 also contains a pressure gauge 190 that directly measures the pressure in each of the three banks of storage containers. The gauge allows emergency personnel or qualified operations personnel to ensure that each bank of the storage containers is fully relieved of pressure when the EDD 182 is activated. The EDD 182 can be by-passed by a manual valve 192 located in the same cabinet.

The generator room 30 and the storage room 32 are also equipped with a network of temperature sensors 194 and fusible links 196 to manage the operation of all equipment and safety devices under all fault situations.

Figure 6:
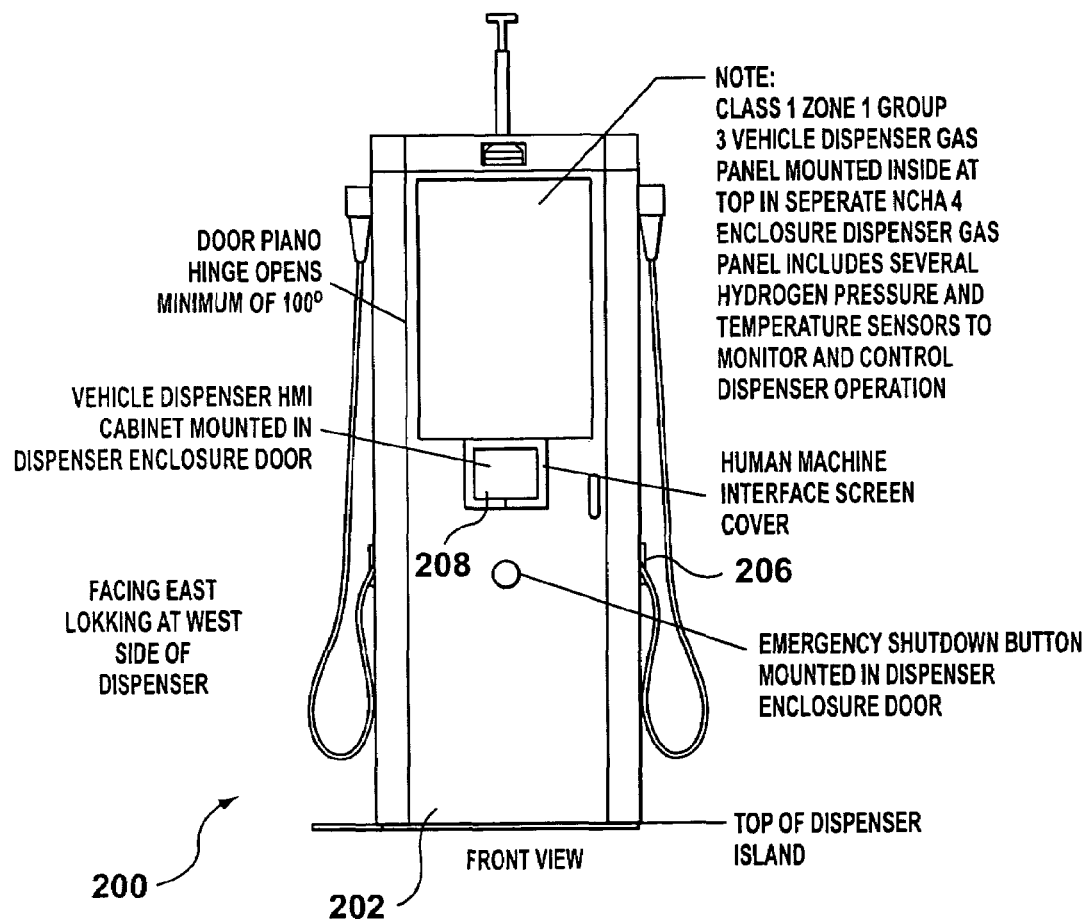
FIG. 6 is a front elevation view of a fuel dispensing device for the fueling station of FIG. 5.

Referring to FIG. 6, a fuel station 200 is shown having at least one hydrogen fuel dispensing device 202. The fuel dispensing device is connected to the storage containers 20 by a supply line 204. The dispensing device includes a nozzle 206 and a control device 208 for dispensing hydrogen fuel at a pre-determined pressure to a receiving apparatus such as a vehicle.

The hydrogen-fueled back-up power system thus provides an advantageous alternative to diesel, and other forms of fuel, for back-up electrical power systems. Such a system has industrial, institutional and commercial uses primarily although other uses may become feasible in future. An advantage of the system is that the stored hydrogen can be utilized for other purposes as well provided that the storage maintains a minimum desired amount for providing the back up power system functionality. For instance, the hydrogen may be used for onsite vehicle fueling.

It is to be understood that what has been described is a preferred embodiment to the invention. If the invention nonetheless is susceptible to certain changes and alternative embodiments fully comprehended by the spirit of the invention as described above, and the scope of the claims set out below.

What is claimed is:

1. A hydrogen storage system comprising:
   a) at least one high pressure hydrogen gas storage container for storing high pressure hydrogen gas, said at least one high pressure hydrogen gas storage container being disposed in a confined area;
   b) a vent line extending from said at least one storage container to a location outside the confined area where said hydrogen gas may be relatively safely released in response to a pre-determined unsafe condition;
   c) at least one sensor disposed in said confined area for detecting one or more predetermined unsafe conditions relating to the storage of hydrogen gas in the confined area; and
   d) at least one actuator in communication with said sensor for releasing hydrogen gas from said at least one high pressure hydrogen gas storage container through said vent line to said location outside of said confined area at a minimum pre-determined release rate in response to a signal received from said sensor.

2. A hydrogen storage system as claimed in claim 1 wherein said at least one sensor includes a hydrogen gas sensor.

3. A hydrogen storage system as claimed in claim 1 wherein said at least one sensor includes a temperature sensor.

4. A hydrogen storage system as claimed in claim 1 wherein said at least one sensor includes a pressure sensor.

5. A hydrogen storage system as claimed in claim 1 wherein said confined area comprises a building.

6. A hydrogen storage system as claimed in claim 1 wherein said hydrogen gas is stored at a pressure of at least about 5000 psig.

7. A hydrogen storage system as claimed in claim 1 further comprising at least one pressure release valve operably connected to said at least one high pressure hydrogen gas storage container, said at least one pressure release valve being set to open at a predetermined pressure to release hydrogen gas through said vent line.

8. A hydrogen storage system as claimed in claim 1 further comprising a fuel station connected to said at least one high pressure hydrogen gas storage container, said fuel station comprising at least one fuel dispensing device for dispensing hydrogen gas to one or more hydrogen powered vehicles.

9. A power system for providing back-up power to a facility comprising:
   a) a generating system disposed at the facility having at least one hydrogen generator and at least one hydrogen powered electrical generator;
   b) a storage system disposed at the facility having at least one high pressure hydrogen gas storage container for storing high pressure hydrogen gas received from said hydrogen generator, said storage system being disposed within said facility;
   c) a conduit for supplying hydrogen gas from said at least one hydrogen generator to said storage system;
   d) a conduit for supplying hydrogen gas from said storage system to said at least one electrical generator;
   e) a power interruption sensor for sensing an interruption in the supply of electric power from a primary electric power source;
   f) a back up power actuator in communication with the power interruption sensor for actuating said at least one hydrogen powered electrical generator to generate electricity in response to a signal from said power interruption sensor indicating an interruption in the supply of electricity from said primary electric power source;
   g) a vent line extending from said at least one high pressure hydrogen gas storage container to a location outside the facility where said hydrogen gas may be relatively safely released in response to a pre-determined unsafe condition;
   h) at least one unsafe condition sensor disposed in said facility for detecting one or more predetermined unsafe conditions relating to the storage of hydrogen gas in the facility; and
   i) at least one actuator in communication with said unsafe condition sensor for releasing hydrogen gas from said at least one high pressure hydrogen gas storage container through said vent line to said location outside of said facility at a minimum pre-determined release rate in response to a signal received from said unsafe condition sensor.

10. A power system as claimed in claim 9 wherein said at least one unsafe condition sensor includes a hydrogen gas sensor.

11. A power system as claimed in claim 9 wherein said at least one unsafe condition sensor includes a temperature sensor.

12. A power system as claimed in claim 9 wherein said at least one unsafe condition sensor includes a pressure sensor.

13. A power system as claimed in claim 9 wherein said hydrogen gas is stored at a pressure of at least about 5000 psig.

14. A power system as claimed in claim 9 further comprising at least one pressure release valve operably connected to said at least one high pressure hydrogen gas storage container, said at least one pressure release valve being set to open at a predetermined pressure to release hydrogen gas through said vent line.

15. A power system as claimed in claim 9 further comprising a fuel station connected to said storage system, said fuel station comprising at least one fuel dispensing device for dispensing hydrogen to one or more hydrogen powered vehicles located at the facility.

16. A power system for a facility comprising:
   a) a hydrogen generator for producing hydrogen;
   b) a hydrogen powered electrical generator for producing electricity;
   c) a storage system comprising at least one storage container for storing hydrogen produced by said hydrogen generator, said at least one storage container being connected to deliver hydrogen to said hydrogen powered electrical generator to produce electricity from hydrogen stored in said storage system;
   d) a fuel station connected to said storage system, said fuel station comprising at least one fuel dispensing device for dispensing hydrogen to one or more hydrogen powered vehicles located at the facility;
   e) a power interruption sensor for sensing an interruption in the supply of electric power to the facility from a primary power source;
   f) a back up power actuator in communication with the power interruption sensor for actuating said at least one hydrogen powered electrical generator to generate electricity in response to a signal from said power interruption sensor indicating an interruption in the supply of electricity from said primary electric power source.

17. A power system as claimed in claim 16, wherein high pressure hydrogen gas is stored in said storage system and wherein said at least one storage container comprises a high pressure hydrogen gas storage container.

18. A power system as claimed in claim 16, wherein said storage system id disposed within a building and further comprising a safety system for releasing said hydrogen gas to a relatively safe location outside of said building in response to a predetermined unsafe condition.

19. A power system as claimed in claim 18, wherein said safety system comprises a vent line extending from said at least one high pressure hydrogen gas storage system to said location outside of said building, at least one unsafe condition sensor disposed in said building for detecting said predetermined unsafe condition and an actuator in communication with said at least one unsafe condition sensor for releasing hydrogen from said at least one high pressure hydrogen gas storage container to said location outside of said building.

20. A power system as claimed in claim 18, wherein said at least one unsafe condition sensor includes a hydrogen sensor.

* * * * *